United States Patent [19]

Miller et al.

[11] Patent Number: 5,072,179

[45] Date of Patent: Dec. 10, 1991

[54] HIGH RESOLUTION ONE AND TWO DIMENSIONAL POSITION INDICATING APPARATUS WITH PLURAL WINDINGS HAVING A COMMON CONNECTION AND SEPARATELY ENERGIZED BY SIGNALS OF DIFFERENT PHASE

[75] Inventors: Gabriel L. Miller, Westfield; Eric R. Wagner, South Plainfield, both of N.J.

[73] Assignee: AT&T Bell Laboratories, Murray Hill, N.J.

[21] Appl. No.: 536,824

[22] Filed: Jun. 12, 1990

[51] Int. Cl.$^5$ .......................... G01B 7/30; G01B 7/14; G08C 19/06

[52] U.S. Cl. .......................... 324/207.16; 324/207.23; 318/661; 340/870.31; 341/112

[58] Field of Search ...... 324/173, 174, 207.16–207.19, 324/207.24, 207.25; 340/870.31, 870.32, 870.35; 341/15, 112, 116; 318/661; 336/45, 130, 135; 310/168

[56] References Cited

U.S. PATENT DOCUMENTS

| | | | |
|---|---|---|---|
| 2,875,524 | 3/1959 | Bower et al. | 324/207.19 X |
| 2,905,874 | 9/1959 | Kelling | 324/207.17 X |
| 3,956,618 | 5/1976 | Gotz | 324/207.19 X |
| 4,700,189 | 10/1987 | Welburn | 340/870.35 |
| 4,717,874 | 1/1988 | Ichikawa et al. | 324/207.16 |
| 4,754,220 | 6/1988 | Shimizu et al. | 340/870.35 X |
| 4,794,511 | 12/1988 | Lundin | 341/116 X |

Primary Examiner—Gerald R. Strecker
Attorney, Agent, or Firm—Geoffrey D. Green

[57] ABSTRACT

Position indicating apparatus that allows position detection with windings provided on only one of two members and an output signal in which the position of one of the members relative to the other member is directly encoded in the phase of the output signal. A first member has a plurality of spaced ferromagnetic protuberances. A second member, movable with respect to the first member, contains at least first, second and third poles located in proximity to the protuberances and spans 360 spatial degrees. Each pole contains a winding with one terminal of each winding connected to a common point. The windings are driven at a fundamental carrier frequency with individual signals of equal amplitude but different temporal phases that span 360 temporal degrees. Circuit means detect the phase of the resulting carrier signal at the common point, which phase is linearly representative of position. Embodiments are disclosed for dimensional linear, one dimensional rotary, two dimensional planar and two dimensional cylindrical motion.

7 Claims, 9 Drawing Sheets

HIGH RESOLUTION ONE AND TWO DIMENSIONAL POSITION INDICATING APPARATUS WITH PLURAL WINDINGS HAVING A COMMON CONNECTION AND SEPARATELY ENERGIZED BY SIGNALS OF DIFFERENT PHASE

TECHNICAL FIELD

The invention relates generally to the field of high resolution electromechanical rotary and linear position sensing such as that provided by resolvers and synchros. It is capable of providing position information in two dimensions simultaneously, and is applicable to linear, rotary, planar and cylindrical coordinate systems.

BACKGROUND OF THE INVENTION

Both resolvers and synchros are well known and widely used devices for measuring angular position (see for instance, "Synchro Conversion Handbook " ILC Data Device Corporation, 105 Wilbur Place, Bohemia, N.Y. 11716. Fourth printing, 1985. Library of Congress Catalog Number 74-77038). When coupled with the use of rack and pinion or belt drives, such devices can also measure linear displacement. The common principle used in these devices is that both a movable and a static member, e.g., a stator and rotor, are equipped with electromagnetic poles and associated windings. The relative position of the two members is determined from the relative amplitudes of the signals generated in the windings of the static member caused by driving the winding of the moving member with a sinusoidal electrical signal. All the signals involved have the same electrical phase. However, it is important to note that because the signal information is encoded in the relative amplitude of the two stator signals, relating this information to the desired angle ($\theta$) is a complex process. In addition, it is necessary to employ windings on both the rotor and the stator elements.

Other resolvers are known in which linear displacement or angular position are detected from the phase difference between an output signal and an applied reference signal. For example, U.S. Pat. No. 4,556,886 shows such a linear displacement detector and U.S. Pat. No. 4,754,220 shows such an angular position detector. In both these examples, the output signal is derived from a separate winding on the stationary element of the resolver.

An advantage of detecting position from a phase difference is that the amplitude of the signal involved is irrelevant and the circuitry needed to convert a phase difference to a digital signal is more straightforward than that needed to compare signals with different amplitudes. Accordingly, it is an object of the invention to detect linear displacement or angular position as a phase difference using a minimum number of windings on only one element of a resolver or equivalent structure.

It is often desirable to be able to detect linear or angular position in two dimensions. Accordingly, it is another object of the invention to detect two-dimensional position from phase differences, again using a minimum number of windings on only one element of a resolver or equivalent structure.

SUMMARY OF THE INVENTION

An improvement in position indicating apparatus allows position measurement with windings provided only on one element, and in addition an output signal in which the position of one of the members relative to the other member is encoded in the phase of the output signal. The apparatus comprises a first member having ferromagnetic protuberances spaced with respect to each other according to a prescribed pattern. A second member is movable with respect to the first member. The second member contains at least first, second and third poles located in proximity to the protuberances of the first member. Different ones of the poles on the second member are spaced with respect to the first member protuberances by spatial phase differences that span 360 degrees of the prescribed pattern. Each pole contains a winding with one terminal connected to a common point in such a way as to form an electrical bridge. Means are provided for driving another terminal of each winding at a fundamental carrier frequency with individual signals that in totality span 360 degrees in electrical phase. Circuit means are provided for detecting the phase of the resulting signal at the common point. It is the phase of this final signal that comprises the position information. Embodiments are also disclosed for two-dimensional motion in which position is similarly detected from phase differences.

BRIEF DESCRIPTION OF THE DRAWING

In the drawing,

FIG. 8b shows graphical representation of output signals from the circuit of FIG. 8a;

DETAILED DESCRIPTION

Figure 1:
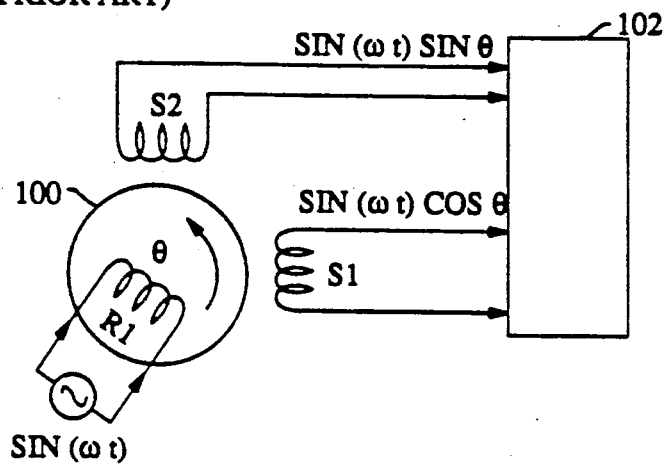
FIG. 1 is a schematic diagram of a typical prior art resolver in which a rotor winding in driven with a sinusoidal signal and the resulting signals on two magnetically orthogonal stator windings are amplitude decoded to determine the relative position of the stator and rotor.

FIG. 1 shows a prior-art resolver consisting of a motor-like structure with a rotatable armature 100 having a winding R1 and two spatially orthogonal stator windings S1 and S2. The winding R1 is driven with a sinusoidal signal Sin($\omega$t), typically at a frequency of a few kilohertz. The two stator signals are of the form Sin($\omega$t)Sin$\theta$ and Sin($\omega$t)Cos$\theta$, where $\theta$ represents the angular position of the rotor. The stator signals are then typically processed with a specially designed circuit 102. This is a "Resolver to Digital" (R/D) silicon chip or hybrid electronic circuit. Such circuits 102 are widely available in the industry, for example, the SDC-1450 Monolithic Hybrid Tracking Resolver to Digital Converter available from ILC Data Device Corporation. The result is a digital measurement of the rotation angle theta, typically up to a resolution of 16 bits.

Figure 2:
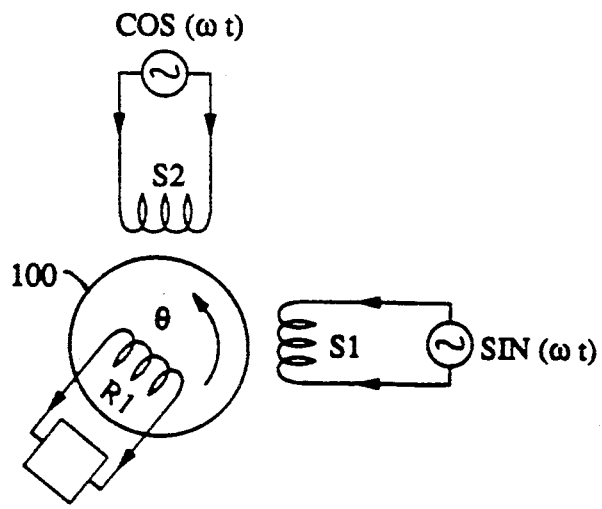
FIGS. 2 through 5 are used to develop the theory of operation of the invention in which windings are required for only one member (e.g., the stator) and the relative position of the members is encoded in the phase of the output signal taken from a common point that joins the windings.

FIG. 2 shows a prior-art embodiment of an angular position resolver in which the angle $\theta$ is encoded in the phase of an output signal taken from a rotatable member. In this embodiment, two stator windings S1 and S2 are driven (instead of being observed as in the prior art of FIG. 1) with respective signals Sin($\omega$t) and Cos($\omega$t) that are ninety degrees apart in electrical phase. The resulting signal appearing across the rotor winding R1 is of the form $$V(t,\theta) = \text{Sin}(\omega t)\text{Sin}(\theta) + \text{Cos}(\omega t)\text{Cos}\theta \quad (1)$$
$$= \text{Cos}(\omega t - \theta)$$

Thus, the rotor angle $\theta$ has been encoded in the phrase of the carrier signal at frequency $\omega$. This method offers electronic simplicity for angle resolvers. Further modifications of its principle of operation, in accordance with the invention to be described, offer additional advantages for both rotary and linear position measurement.

Figure 3:
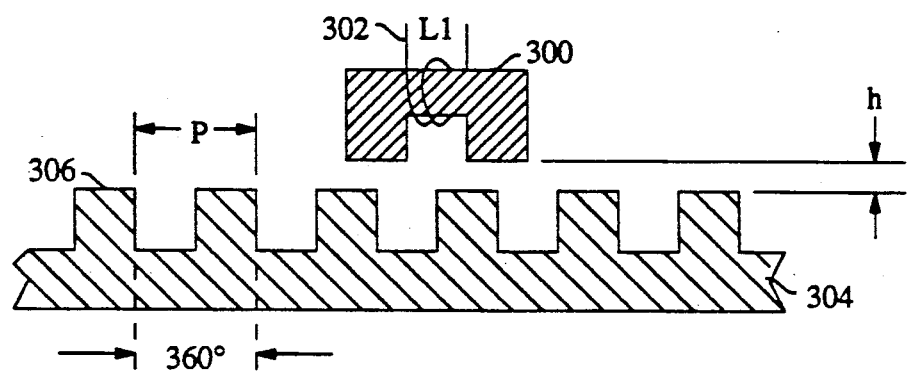
Figure 4:
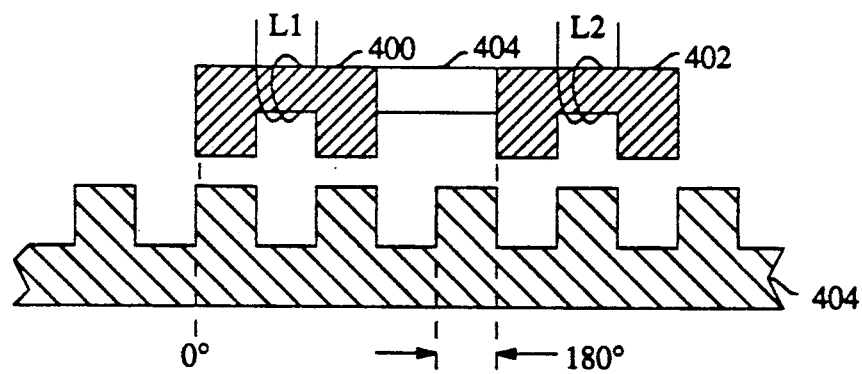
Figure 5:
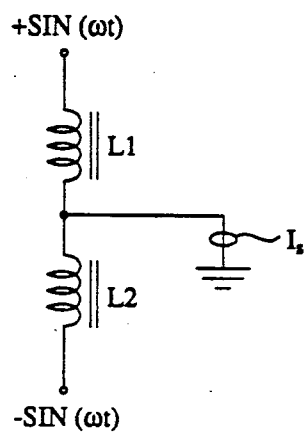

FIGS. 3, 4 and 5 will be used to develop the theory of the invention wherein windings are used on only one of the members to measure movement while still retaining the position information in the phase of the output signal. In FIG. 3, a small ferromagnetic core 300, with a winding 302 of inductance L1, rides at a height h just above a slotted ferromagnetic plate or "platen" 304. Platen 304 contains a series of protuberances 306 that spatially repeat with a period P. As the core 300 moves transversely with respect to platen 304, the inductance of L1 varies essentially $$L1 = L_o\left(1 + \Delta\text{Sin}\left(\frac{2\pi x}{P}\right)\right) \quad (2)$$

where L0 is the average value of the inductance of L1 and $\Delta$ is the modulation index of the inductance variation. (In practice the inductance of L1 may not be exactly sinusoidal with distance x, but this can be shown not to be an important consideration).

In principle, this simple system of FIG. 3 could be used as the basis for incremental position encoding. This follows directly from equation 2. However in practice this would unsatisfactory since $\Delta$is an extremely rapid function of the spacing h. Consequently, h itself would have to be known at all points with great accuracy to allow determination of the position x. This difficulty arises precisely because one is concerned with the magnitude of the inductance in equation 2.

In FIG. 4, two identical ferromagnetic cores 400 and 402, with equal windings L1 and L2, are spatially disposed at 180° with respect to the platen period, and situated just above the platen surface. The two cores are rigidly attached to one another by the element 404. If L1 and L2 are connected together to form a simple electrical bridge and are driven with sinusoidal signals that are 180 degrees out of phase with each other, as shown in FIG. 5, then the magnitude of the signal current $I_s$ flowing to ground will vary according to Sin($2\pi x/P$).

Figure 6:
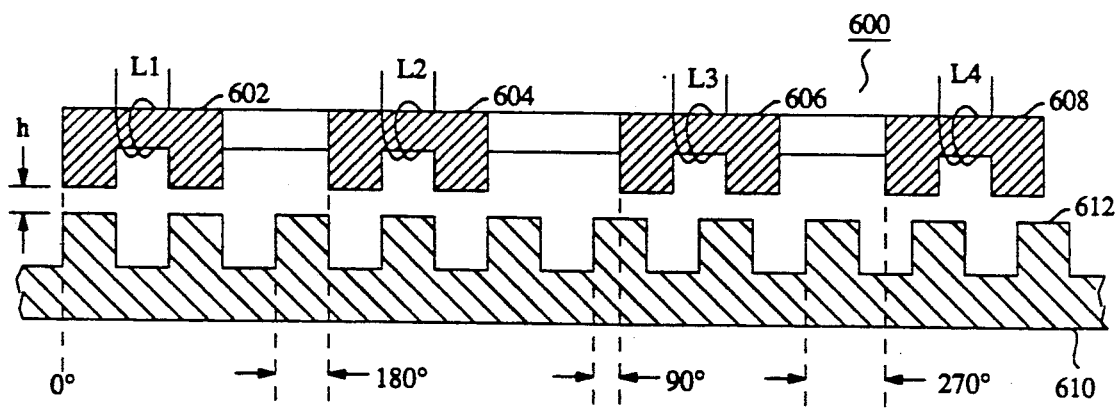
FIG. 6 shows one embodiment of the invention in which linear position indicating apparatus uses four windings on one member, with the poles of pairs of the windings spaced in spatial quadrature with respect to one another.
Figure 7:
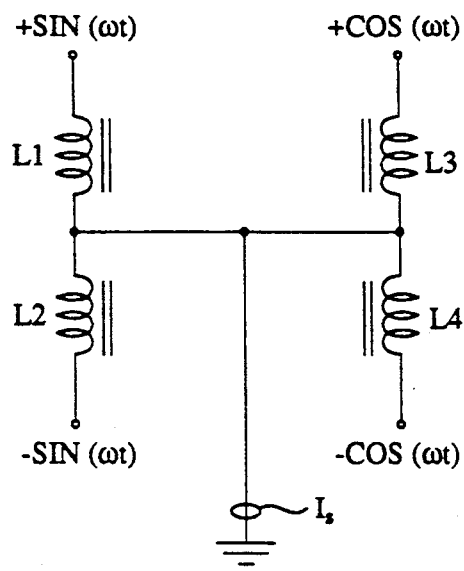
FIG. 7 shows a bridge configuration of the windings of FIG. 6, with one terminal of each of the windings connected at a common point to a virtual ground.

Next, consider FIG. 6 in which a further identical pair of coils L3, L4 have been added to the arrangement of FIG. 4, such that L1 through L4 now span 360 spatial degrees at 90 degree intervals with respect to the protuberances 612 of platen 610. The windings L1 through L4 are driven in an electrical bridge configuration, as shown in FIG. 7, by quadrature signals $\pm$Sin($\omega$t) and $\pm$Cos($\omega$t). The total signal current $I_s$ flowing to ground in FIG. 7 therefore takes the form, $$I_s = I_o\left[\text{Sin}(\omega t)\text{Sin}\left(\frac{2\pi x}{P}\right) + \text{Cos}(\omega t)\text{Cos}\left(\frac{2\pi x}{P}\right)\right] \quad (3)$$

where I0 is a constant representing the signal current magnitude. It therefore follows from equation (3), by a trigonometric identity, that $$I_s = I_o \text{Cos}\left(\omega t - \frac{2\pi x}{P}\right) \quad (4)$$

i.e., $$I_s = I_o \text{Cos}(\omega t - \phi). \quad (5)$$

This indicates that the phase $\phi$ of the alternating current. $I_s$, which is given by $\phi = 2\pi x/P$, is itself a direct and proportional measure of the required position X. It follows that the position information X is obtained in a way that is independent of the spacing h (this can be important in application involving air bearings of variable thickness). And furthermore it must be noted that the relative position information of the elements 600 and 610 of FIG. 6 has been obtained in such a way that electrical windings are only required on one element, namely 600, and not on the platen 610.

Figure 8A:
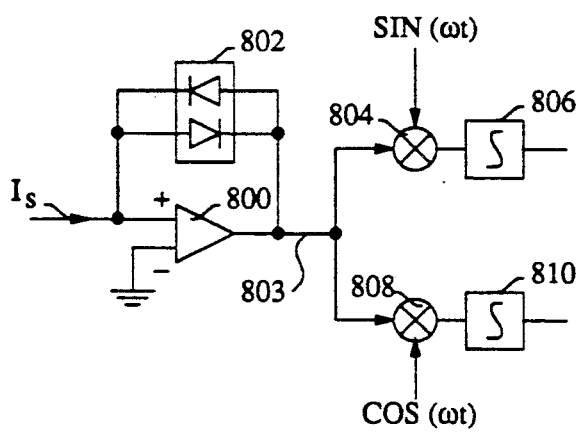
FIG. 8a and 8b shows position detecting circuitry that employs the current flowing to the common point connection to ground of FIG. 7.
Figure 8B:
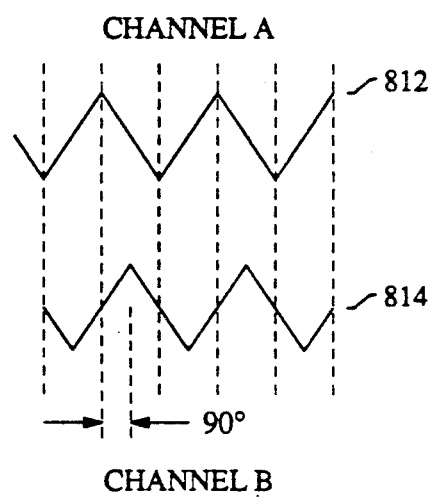

Signal processing can be carried out in a number of ways. One simple method for detecting the relative position of members 600 and 610 is shown in FIG. 8a. An operational amplifier 800 is inserted into the path of Is to ground. Two back-to-back diodes 802 form the amplifier feedback element. This system transforms the sinusoidal signal $I_s$ into an approximate square wave signal on lead 803. This signal is fed to two phase detectors for creating CHANNEL A and CHANNEL B signals. The CHANNEL A phase detector consists of a multiplier 804 and integrator 806. A second input to multiplier 804 provides a signal Sin($\omega$t). This second input signal to multiplier 804 can also conveniently be shaped to approximate a square wave. CHANNEL B is identical to CHANNEL A, except that the second input to CHANNEL B multiplier 808 is a signal Cos($\omega$t) 90 degrees out of phase with the corresponding signal to CHANNEL A. FIG. 8b shows output signals 812 and 814 from integrators 806 and 810, respectively.

Output signals 812 and 814 from integrators 806 and 810 are both linear representations of the position of the member 600 relative to that of member 610. Thus, as member 600 moves a distance of 360 spatial degrees relative to member 610, signals 812 and 814 each vary through a complete cycle of 360 degrees. A distance moved by member 600 relative to member 610 from a starting position to a stopping position can be determined by measuring the magnitude of one of signals 812 and 814 at both positions and counting the number of complete cycles of such signal elapsed during such movement. Absolute position can be tracked by starting at a known reference point and continually updating the absolute position after each movement. The direction of movement can be determined from the leading or lagging relationship of changes in signal 812 relative to changes in signal 814 during movement. It is of particular note that these position signals are derived purely from the phase of signal current $I_S$ of FIG. 7, i.e., the magnitude of $I_s$ plays no significant role. This is of importance in certain applications of planar positioning systems of the type shown in FIG. 6, in which the spacing h is provided by an air bearing which may be a variable thickness.

Figure 9A:
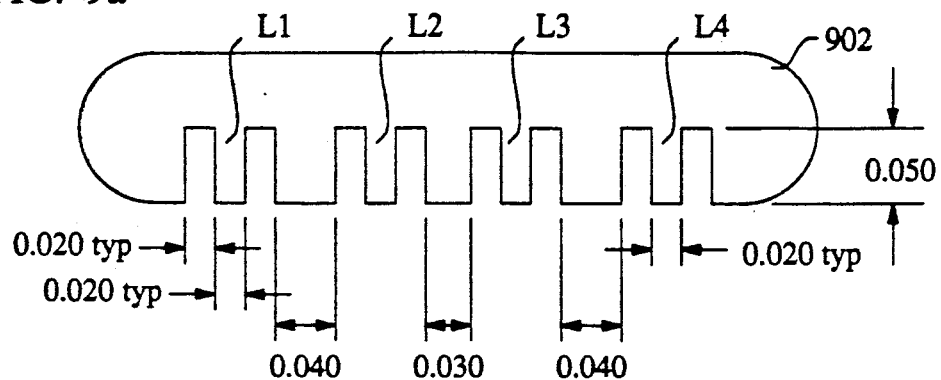
FIG. 9a and 9b shows two views of illustrative sensor construction for the four windings of FIG. 6, which are cut to correspond to a platen of a 40 mil pitch.
Figure 9B:
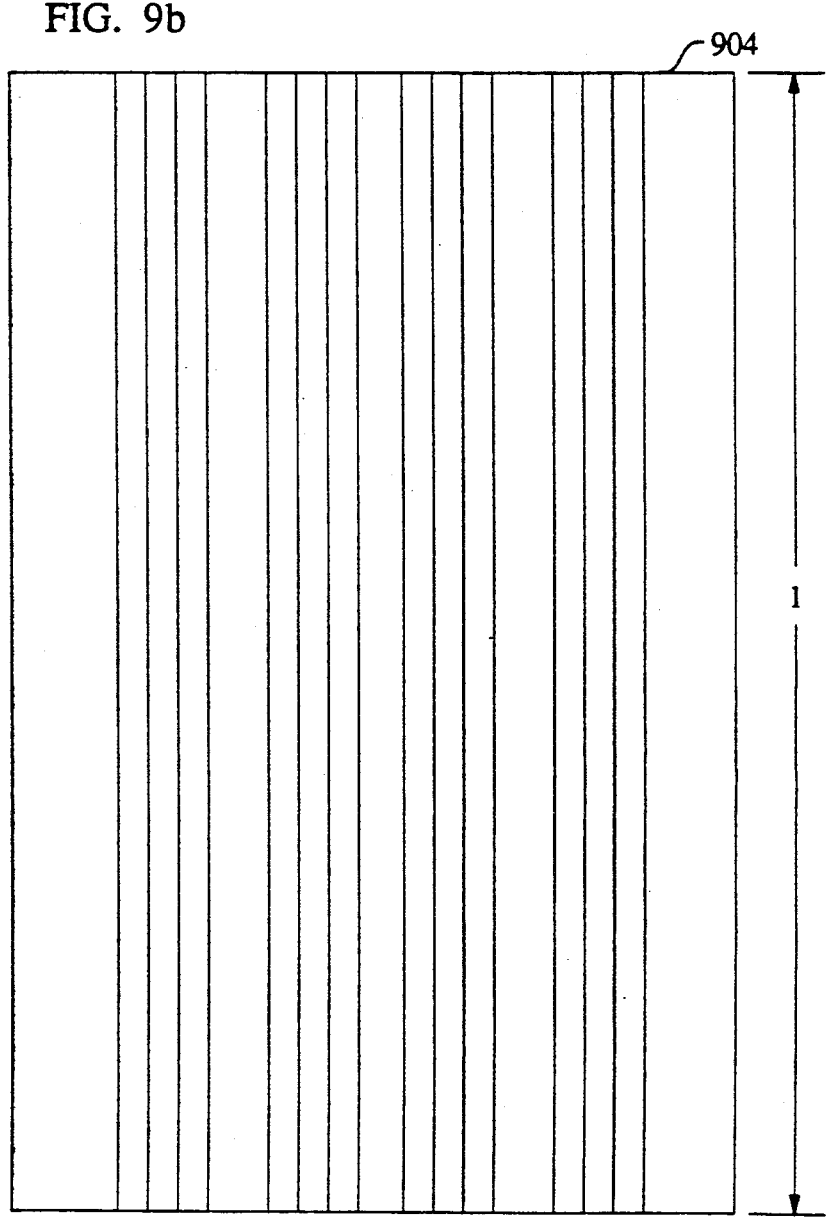
Figure 10:
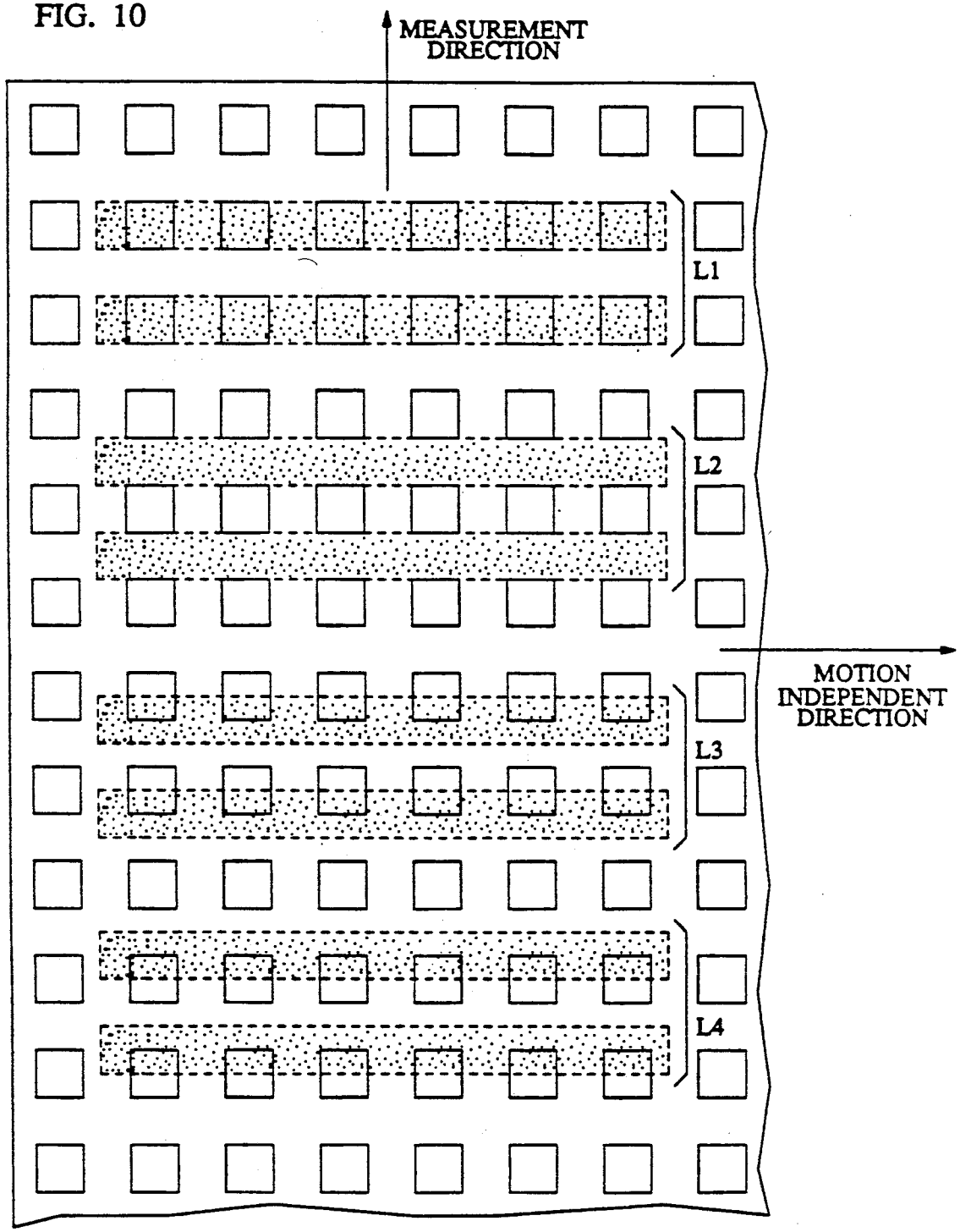
FIG. 10 shows a platen designed for two dimensional motion that employs 20 mil square posts separated by 20 mil valleys.

The relative positions and dimensions of the cores 602, 604, 606 and 608 of FIG. 6 need to be precisely matched to the period of the protuberances 612 of platen 610. One convenient way to achieve this is to cut slots, using for example a precision diamond saw, into a suitably sized ferrite plate. FIG. 9a shows an end view 902 of a suitably cut core for a 40 mil (1 mm) pitch platen. FIG. 9b shows a top view 904 of the core shown in FIG. 9a. By way of example, this core is cut using four E-core configurations for L1, L2, L3, L4, rather than the simpler U-cure configurations of FIG. 6. For this core example, a winding of 15 turns of 39 AWG enamelled wire fills each slot, providing the L1, L2, L3, L4 windings, each with inductances of approximately 40 $\mu$h. Each coil may be current driven at approximately 100 khz with approximately 1 ma of alternating current. Furthermore, while all of the preceding description has been centered on the measurement of one dimensional motion this sensor can be used in two dimensional systems. For this application, the platen consists of a regular checkerboard of 20 mil posts separated by 20 mil valleys, as indicated in FIG. 10.

Figure 11:
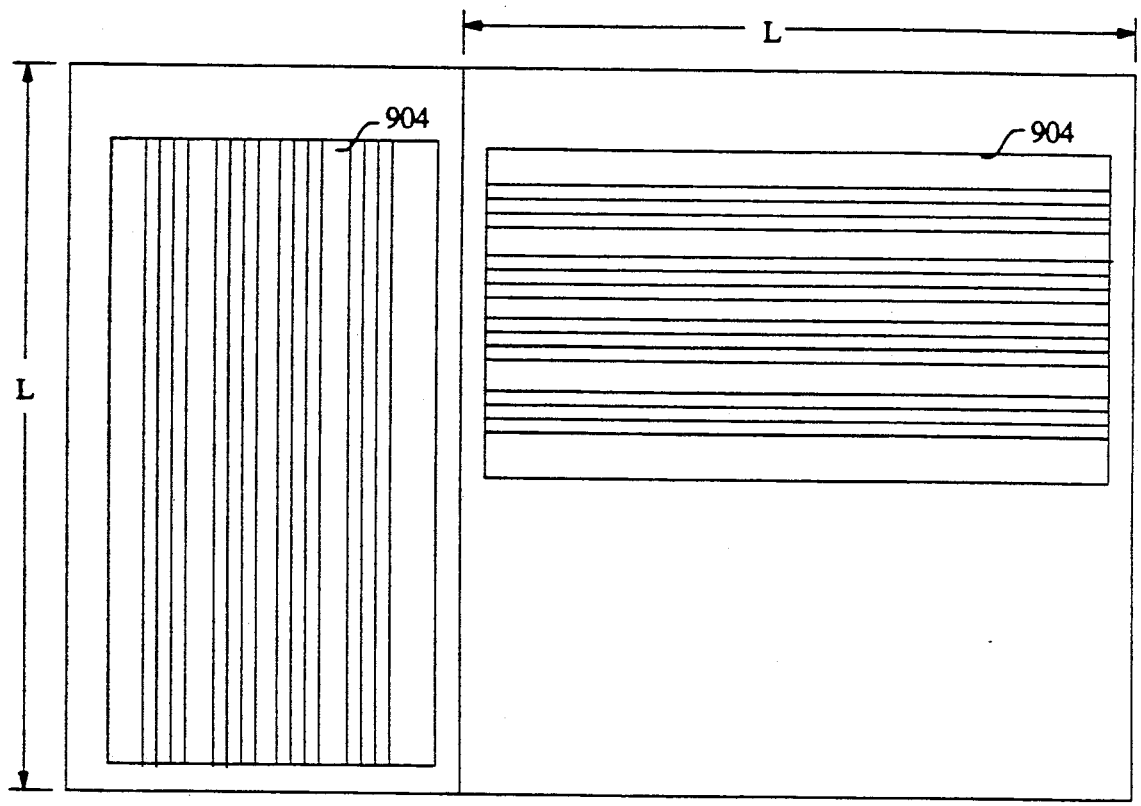
FIG. 11 shows two of the sensors of FIG. 9, with one of the sensors rotated by ninety degrees with respect to the other to provide both X and Y position sensing simultaneously.

If the length 1 of the sensor is an integral number of the basic 40 mil periods of the platen, this renders the measurement essentially independent of translational motion in the direction of 1. Consequently, two such cores 904 can be mounted at 90° as shown in FIG. 11, which with appropriate other circuitry as discussed, can be used to provide independent X, Y position information.

Figure 12:
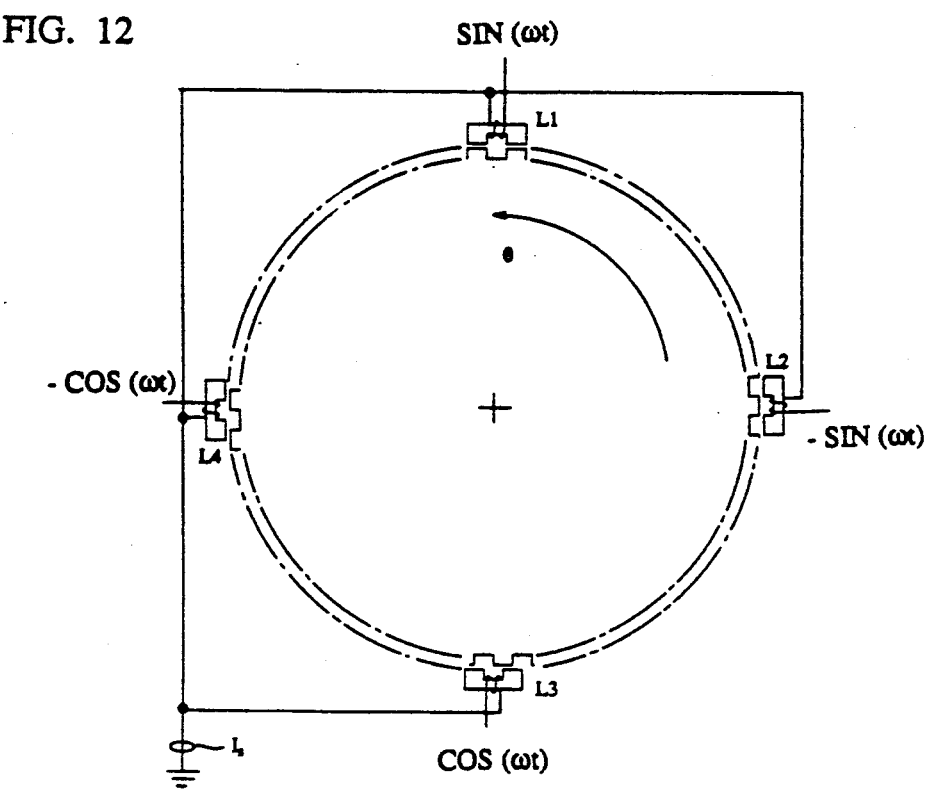
FIG. 12 shows the rotational equivalent of the linear apparatus of FIGS. 6 and 7.
Figure 13:
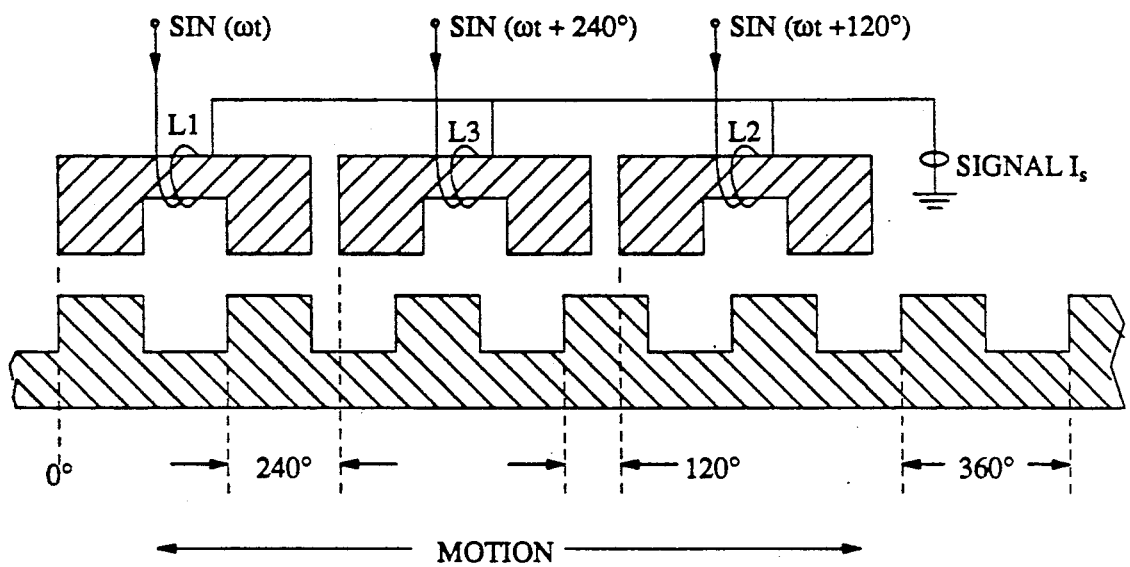
FIGS. 13 and 14 show respective linear and rotary three phase versions of the similar apparatus of FIGS. 6 and 11.
Figure 14:
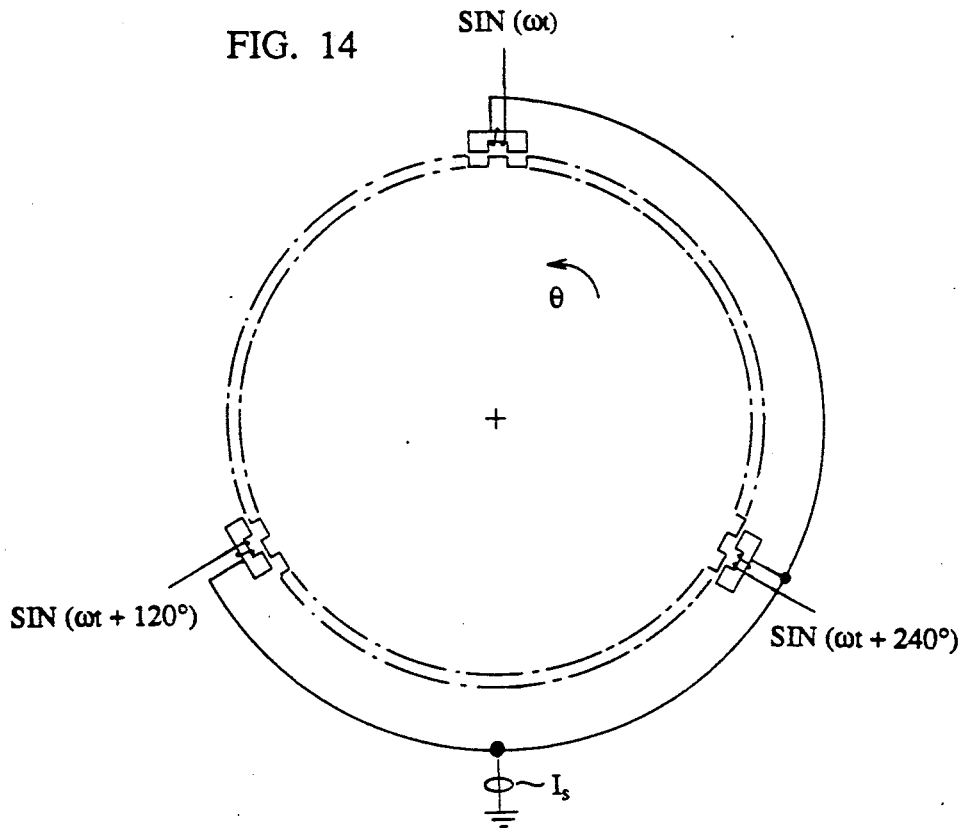

In view of the above discussion, other embodiments may now be briefly discussed without unnecessary detail. FIG. 12 shows an embodiment of the invention which is the rotary equivalent of the linear apparatus of FIGS. 6 and 7. FIG. 13 shows an illustrative linear embodiment which follows the principles of FIG. 6 for a three phase linear position indicating apparatus. FIG. 14 shows the equivalent of FIG. 13 for a rotary three phase apparatus. In any of these alternative embodiments, circuits of the type of FIG. 8a, for example, may be used to generate signals for position sensing and detection of relative direction of movement. If desired, high resolution position interpolation can also be carried out on the linear sloping region of the output signals of FIG. 8b. Alternatively, high resolution position interpolation can be carried out directly by measuring the phase of the signal $I_s$ with respect to the carrier $Sin(\omega t)$ in any of the preceding realizations.

Figure 15:
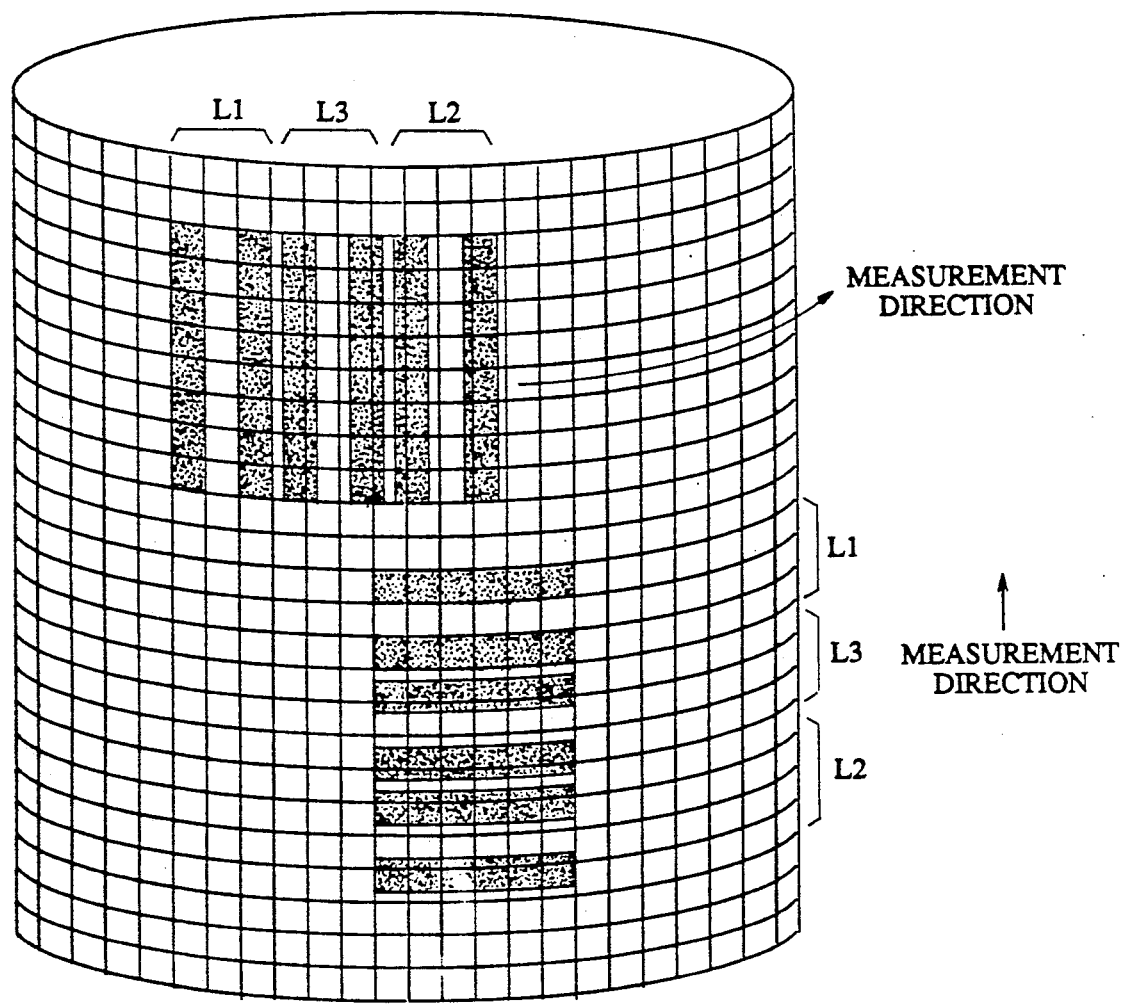
FIG. 15 shows a cylindrical version of the two dimensional scheme of FIGS. 9, 10 and 11, but employing the three phase system of FIG. 13.

It is also clear that by a direct extension of the planar two dimensional sensing arrangements of FIGS. 9a, 9b and 10 and 11, it is possible to provide two dimensional sensing or the motion of a cylinder. This is shown in FIG. 15, for a three phase system like that of FIG. 13. It is to be understood that the above described arrangements are merely illustrative of the application of principles of the invention and that other arrangements may be devised by workers skilled in the art without departing from the spirit and scope of the invention.

We claim:

1. Position indicating apparatus, comprising first and second magnetic members movable with respect to each other, said first member having protuberances thereon in a periodic pattern, at least three poles located on said second member in proximity to said protuberances so that said poles move in and out of magnetic alignment with said protuberances in a spatial cycle defined by said periodic pattern as said first and second members move relatively, said poles being located with respect to each other at different points in said spatial cycle, a single winding on each said pole, each winding having first and second terminals, the first terminal of each winding being connected to a common point, means for driving the second terminal of each winding with an individual alternating signal, said individual signals having the same frequency but different phrases corresponding to the positions of said poles in said spatial cycle, means for detecting the phase of the resulting signal at said common point with respect to the phase of at least one of said individual signals, whereby said detected phase represents the position of said first member with respect to said second member.

2. The apparatus of claim 1 wherein the phase detecting means further comprises means for determining from the leading or lagging phase relationship of the resulting signal at the common point with respect to the phase of at least one of said individual signals the direction of relative movement of the first and second members with respect to the each other.

3. The apparatus of claim 1 wherein the first and second members are planar members to form a linear displacement position indicating apparatus.

4. The apparatus of claim 1 wherein the first and second members are coaxially oriented to form rotary displacement position indicating apparatus.

5. The apparatus of claim 1 wherein the protuberances on said first member are oriented in both first and second dimensions and the poles on said second member are duplicated; the first set of said poles being oriented to detect motion of said members with respect to each other in said first dimension and the second set of said poles being oriented to detect such motion in said second dimension.

6. The apparatus of claim 5 wherein said first and second dimensions reorthogonal.

7. The apparatus of claim 1 wherein said first and second members are cylindrical, the protuberances on said first member are oriented in both a linear dimension and a rotary dimension and the poles on said second member are duplicated; the first set of said poles being oriented to detect linear motion of said members with respect to each other and said second set of poles being oriented to detect rotary motion of said elements with respect to each other.

* * * * *